Oct. 18, 1938.  R. J. WATERBURY  2,133,602
STRIKER PLATE
Filed Jan. 4, 1936
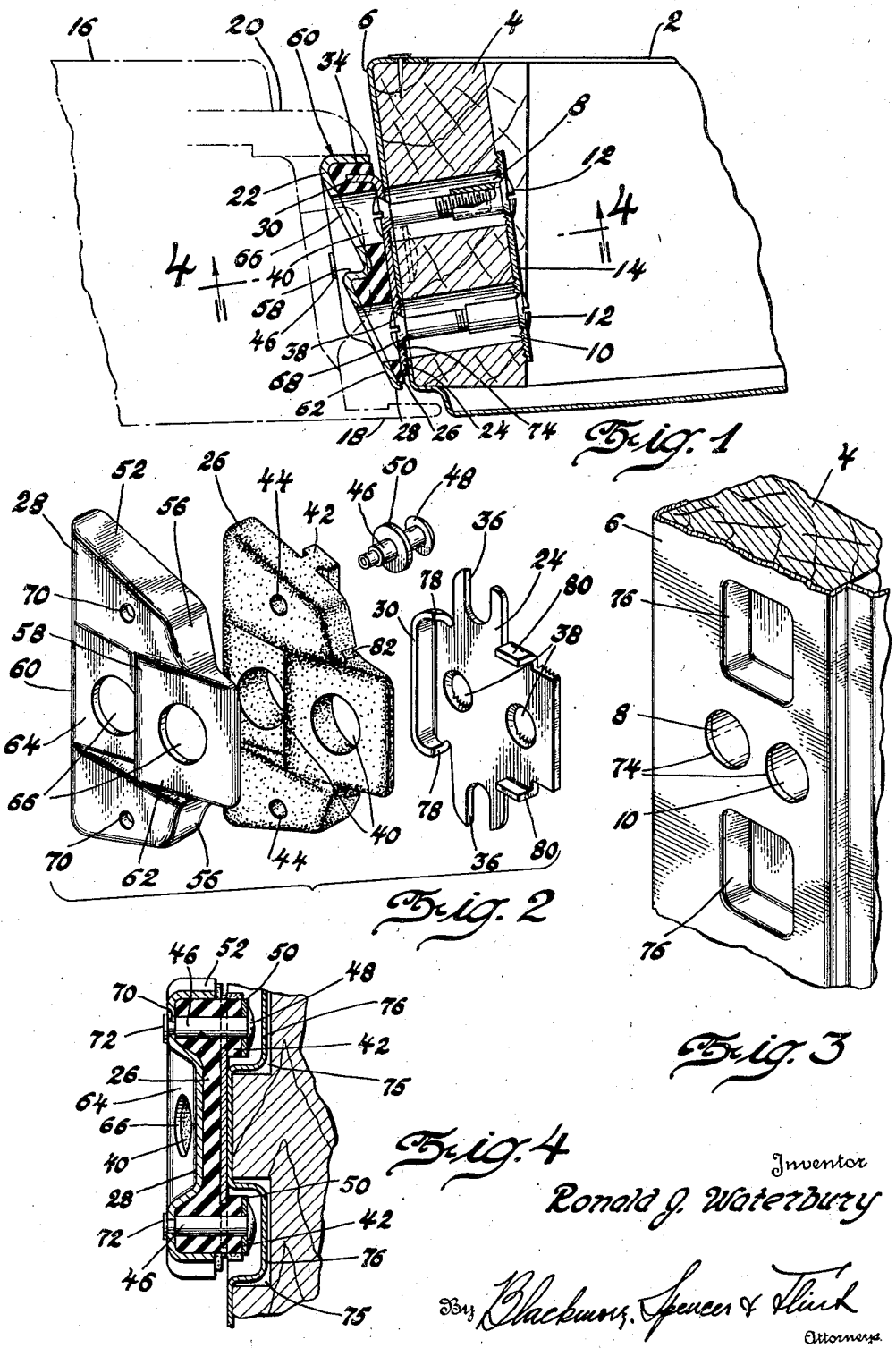
Inventor
Ronald J. Waterbury
By Blackburn, Spencer & Fluck
Attorneys Patented Oct. 18, 1938

2,133,602

UNITED STATES PATENT OFFICE 2,133,602

STRIKER PLATE

Ronald J. Waterbury, Birmingham, Mich., assignor to General Motors Corporation, Detroit, Mich., a corporation of Delaware Application January 4, 1936, Serial No. 57,460

5 Claims. (Cl. 292—340)

This invention relates to improvements in striker plates adapted for the doors of automotive vehicles. The invention is an improvement over that disclosed in my copending application Ser. No. 733,389, filed July 2, 1934.

In the present invention the striker plate comprises three main parts which in all respects are substantially similar to the three parts of the striker plate of the prior application. In the prior application the intermediate rubber pad was vulcanized to the base plate and to the striker plate per se and formed the only union or means of connection between the parts. In the present invention the improvement resides in eliminating the necessary bonding operation between the rubber and the metal. The construction of the present invention is formed in three separate and distinct pieces which are assembled and then secured together by means of two rivets which form the means for holding the parts together.

On the drawing:

Figure 1 is a sectional view through the door pillar and door post showing the application of the invention.

Figure 2 is an expanded view of the striker plate construction.

Figure 3 is a perspective view of the door pillar to which the striker plate construction is applied.

Figure 4 is a sectional view on the line 4—4 of Figure 1.

Referring to the drawing, the numeral 2 indicates an automobile body as a whole. The body has the door pillar 4 which is covered by the usual metal sheathing or skin 6. The door pillar is provided with the openings 8 and 10 which are adapted to receive the fastening means 12 which fasten the striker plate construction in place. Inside the pillar 4 a fastening plate 14 for the fastening means 12 is used. The door is indicated at 16, the overlap flange at 18, while 20 indicates the bolt of the lock.

The striker plate construction is indicated as a whole at 22 and comprises the base plate 24, the intermediate rubber pad 26 and the outer striker plate per se 28. The base 24 has the rear outwardly extending flange 30 which projects into a recess 34 in back of the rubber pad 26 as is best shown in Figure 1. In addition to the flange the base plate 24 has the notches or recessed portions 36 at its sides and the chamfered bolt receiving openings 38.

The pad 26, in addition to having the recess 36, is provided with the openings 40 which mate with the openings 38. The pad has the feet or projecting portions 42 on the underside thereof, the feet being in the form of a T as is best shown in Figure 2 so that when the pad 26 is assembled with the base 24 the head of the T will extend under the edges of the recesses 36 as best shown in Figure 4. Suitable openings 44 in the pad are provided to allow for the passage of the fastening means 46 which are in the form of rivets. Each rivet has the head 48, and an enlarged washer 50 is used to press against the head of the T 42 as is shown in Figure 4.

The striker plate per se 28 is hollow and of a shape conforming to the shape of the pad 26 and adapted to receive the same. The plate 28 has the lateral flanges 52, the rear flange 60 and the front flanges 56 to give a dish shape to the plate and surround the pad 26. The plate has the two steps 58 and 60 behind which the bolt 20 engages and immediately ahead of the steps 58 and 60 are the inclined portions 62 and 64 respectively. The pad 26 has step portions conforming to the steps 58 and 60. In each of the inclined portions 62 and 64 there are the openings 66 which mate with the openings 40 in the pad and the openings 38 in the base. The openings 40 and 66 are larger than the head 68 of the fastening means 12 so that these means will pass through the striker plate and pad and catch on the chamfered openings 38 in the base plate as shown in Figure 1. Openings 70 in the striker plate 28 mate with the openings 44 in the pad and with the recesses 36 in the base plate. By assembling the parts and passing the rivets 46 from below through the recesses 36 and the openings 44 and 70 and then turning over the rivet end 72 as shown in Figure 4, the parts are rigidly and permanently held together.

Referring to Figure 3, it will be noted that openings 74 are provided in shell 6 to mate with the openings 8 and 10 in the post 4 to allow the passage of the fastening means 12, and recesses 75 are provided in the pillar 4 to receive the pressed-in portions 76 of the shell which are provided for the reception of the heads of the rivets 46 and the feet or projections 42, as is best shown in Figure 4.

By referring to Figure 4 it will be noted that there is a considerable portion of rubber between the rivets 46 and the recesses 76. In other words, the recesses 76 are considerably larger than the rivets so that the feet 42 will extend into the recesses and provide a substantial thickness of rubber between the recess edges and the rivets 46. The purpose of this construction is to allow to the striker plate 28 a limited amount of movement relative to the base plate 24. This limited amount of movement will be allowed by the resiliency of the rubber.

In order to prevent the rubber from shifting bodily relative to the base plate 24, the flange 30 has its ends 78 inwardly bent and received in the recess 34 formed in the rubber pad 26; and tongues 80 are bent from the plate and received in recesses 82 in the rubber 26. The bent ends 78 and the tongues 80 will hold the rubber pad 26 on the plate 24 and prevent slipping of the rubber relative to the plate.

I claim:

1. A striker plate construction for vehicle doors, a base plate, a rubber pad over the base plate, a striker plate over the rubber pad, said base plate, striker plate, and pad having a plurality of mating openings to enable the passage of securing means to fasten the construction to a door pillar, projecting portions on the pad extending beyond the base plate, and a plurality of fastening means passing through the pad and projecting portions and through the striker plate to form the means for holding the parts together.

2. In a striker plate construction for vehicle doors, a base plate, a rubber pad over the base plate, a striker plate over the rubber pad, said base plate, striker plate, and pad having a plurality of mating openings to enable the passage of securing means to fasten the construction to a door pillar, said base plate having a plurality of notches in its sides, and a plurality of fastening means passing through the notches, the pad, and the striker plate to form the means to hold the parts together.

3. In a striker plate construction for vehicle doors, a base plate, a rubber pad over the base plate, a striker plate over the rubber pad, said base plate, striker plate, and pad having a plurality of mating openings to enable the passage of securing means to fasten the construction to a door pillar, said base plate having a plurality of notches in its sides, a plurality of projections on the pad adapted to extend through the notches and underlap the edges thereof, and a plurality of fastening means passing through the notches, the projections, the pad and the striker plate to form the means to hold the parts together.

4. A striker plate construction for vehicle doors, a base plate, a separable rubber pad over and covering the base plate, a separable striker plate over the rubber pad, said base plate, striker plate, and pad having a plurality of mating openings to enable the passage of securing means to fasten the construction to a door pillar, a plurality of fastening means passing through the pad and through the striker plate to form the means for holding the parts together, and a plurality of tongues on the edge of the base plate to prevent bodily shifting of the pad relative to the plate.

5. A striker plate construction for vehicle doors, a base plate, a separable rubber pad over and covering the base plate, a separable striker plate over the rubber pad, said base plate, striker plate, and pad having a plurality of mating openings to enable the passage of securing means to fasten the construction to a door pillar, a plurality of fastening means passing through the pad and through the striker plate to form the means for holding the parts together, and a plurality of tongues on the edge of the base plate engaging in recesses in the pad to prevent bodily shifting of the pad relative to the plate.

RONALD J. WATERBURY.